(12) United States Patent
Hansen et al.

(10) Patent No.: US 11,380,904 B2
(45) Date of Patent: Jul. 5, 2022

(54) CONTINUOUS MANUFACTURING METHOD FOR PRODUCING NON-REINFORCED ELECTROCHEMICAL CELL COMPONENT USING NON-SOLVENT BATH AND PORE-FORMING BATH

(71) Applicant: Siemens Energy Global GmbH & Co. KG, Munich (DE)

(72) Inventors: Martin Kalmar Hansen, Vanløse (DK); Kasper Tipsmark Therkildsen, Lille-Skensved (DK)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 106 days.

(21) Appl. No.: 16/608,436

(22) PCT Filed: Apr. 13, 2018

(86) PCT No.: PCT/EP2018/059552
§ 371 (c)(1),
(2) Date: Oct. 25, 2019

(87) PCT Pub. No.: WO2018/197236
PCT Pub. Date: Nov. 1, 2018

(65) Prior Publication Data
US 2020/0052307 A1   Feb. 13, 2020

(30) Foreign Application Priority Data
Apr. 26, 2017   (EP) ..................................... 17168178

(51) Int. Cl.
*H01M 4/88* (2006.01)
*B01D 39/20* (2006.01)
(Continued)

(52) U.S. Cl.
CPC .......... *H01M 4/88* (2013.01); *B01D 39/2082* (2013.01); *H01M 4/0435* (2013.01);
(Continued)

(58) Field of Classification Search
CPC .... H01M 4/88; H01M 4/0435; H01M 4/8605; H01M 8/023; B01D 39/2082
(Continued)

(56) References Cited

U.S. PATENT DOCUMENTS

| 2007/0006965 A1 | 1/2007 | Burchardt ................ 156/244.24 |
| 2007/0111878 A1 | 5/2007 | Zuberi ......................... 501/95.1 |

(Continued)

FOREIGN PATENT DOCUMENTS

| CN | 1259773 A | 7/2000 | ........ H01M 10/0525 |
| CN | 103396579 A | 11/2013 | ................ C08J 9/12 |

(Continued)

OTHER PUBLICATIONS

Schaschke, Carl. "fluid." In a Dictionary of Chemical Engineering. : Oxford University Press, 2014. https://www.oxfordreference.com/view/10.1093/acref/9780199651450.001.0001/acref-9780199651450-e-1187. (Year: 2014).*

(Continued)

*Primary Examiner* — Sean P Cullen
(74) *Attorney, Agent, or Firm* — Slayden Grubert Beard PLLC

(57) ABSTRACT

Various embodiments include a continuous manufacturing method for producing a non-reinforced electrochemical cell component for an electrochemical conversion process, the method comprising: forming a web-form from a web-material suspension directly on a surface of a conveyor belt of a conveyor mechanism, wherein the web-material suspension comprises interconnecting entities suspended in a solution, the solution including an organic polymer binding
(Continued)

material as a solute and a solvent for the solute, and a pore-forming material; advancing the web-form through a first non-solvent bath, wherein the first non-solvent bath comprises a first non-solvent configured to introduce a phase inversion in the web-form to form a web; detaching the web from the surface of the conveyor belt; advancing the web through a pore-forming bath to form the component; and collecting the component.

15 Claims, 3 Drawing Sheets

(51) Int. Cl.
| | | |
|---|---|---|
| H01M 4/04 | (2006.01) | |
| H01M 4/86 | (2006.01) | |
| H01M 8/023 | (2016.01) | |
| H01M 10/42 | (2006.01) | |
| C25B 11/031 | (2021.01) | |

(52) U.S. Cl.
CPC ......... *H01M 4/8605* (2013.01); *H01M 8/023* (2013.01); *H01M 10/4285* (2013.01); *C25B 11/031* (2021.01)

(58) Field of Classification Search
USPC .................................................. 429/483, 535
See application file for complete search history.

(56) References Cited

U.S. PATENT DOCUMENTS

| | | | | |
|---|---|---|---|---|
| 2009/0081518 A1* | 3/2009 | Miyachi | ................. | B01D 71/68 429/490 |
| 2009/0208807 A1* | 8/2009 | Miyachi | ............. | B01D 67/0088 429/490 |
| 2010/0239946 A1* | 9/2010 | Miyachi | ............. | H01M 8/1039 429/483 |
| 2013/0280583 A1 | 10/2013 | Lee et al. | ....................... | 429/144 |
| 2017/0373327 A1* | 12/2017 | Dufton | .................. | H01M 8/023 |

FOREIGN PATENT DOCUMENTS

| | | | | |
|---|---|---|---|---|
| CN | 103814460 A | | 5/2014 | .......... H01M 10/058 |
| CN | 104272499 A | | 1/2015 | .......... H01M 10/052 |
| CN | 104716348 A | * | 6/2015 | |
| CN | 106532104 A | | 3/2017 | ................ C08J 9/28 |
| EP | 3 085 815 A1 | | 10/2016 | ............. C25B 13/08 |
| JP | 2007042586 A | * | 2/2007 | |
| JP | 2008204951 A | * | 9/2008 | |
| JP | 2008204952 A | * | 9/2008 | |
| JP | 2008282795 A | * | 11/2008 | |
| WO | 2005/099864 A1 | | 10/2005 | ............. B01D 39/20 |
| WO | 2013/153014 A1 | | 10/2013 | .......... H01M 10/052 |

OTHER PUBLICATIONS

Schaschke, Carl. "solvent." In a Dictionary of Chemical Engineering. : Oxford University Press, 2014. https://www.oxfordreference.com/view/10.1093/acref/9780199651450.001.0001/acref-9780199651450-e-2670. (Year: 2014).*

Search Report for International Application No. PCT/EP2018/059552, 11 pages, dated Jul. 25, 2018.

Search Report for EP Application No. 17168178.6, 7 pages, dated Oct. 30, 2017.

Chinese Office Action, Application No. 201880026941.9, 5 pages, dated Jan. 27, 2021.

* cited by examiner

CONTINUOUS MANUFACTURING METHOD FOR PRODUCING NON-REINFORCED ELECTROCHEMICAL CELL COMPONENT USING NON-SOLVENT BATH AND PORE-FORMING BATH

CROSS-REFERENCE TO RELATED APPLICATIONS

This application is a U.S. National Stage Application of International Application No. PCT/EP2018/059552 filed Apr. 13, 2018, which designates the United States of America, and claims priority to EP Application No. 17168178.6 filed Apr. 26, 2017, the contents of which are hereby incorporated by reference in their entirety.

TECHNICAL FIELD

The present disclosure relates to manufacturing. Various embodiments may include non-reinforced electrochemical cell components for electrochemical conversion processes and/or techniques of continuous manufacturing of non-reinforced electrochemical cell components.

BACKGROUND

In modern times, electrochemical conversion processes such as electrolysis are used for various purposes, for example in hydrogen and/or oxygen generation achieved by hydrogen evolution reaction (HER) and oxygen evolution reaction (OER) in an electrolyser by electrolysis of an electrolyte, generally water. Usually, alkaline or acidic water is used as the electrolyte. Other example is electrochemical reduction of carbon dioxide. The electrochemical conversion devices in which such electrochemical conversion processes are performed, for example an electrolyser, include electrodes, referred to as gas diffusion electrodes, that conduct electrical energy to the electrolyte and thus decomposes the electrolyte and/or other added reactants to generate desired products such as oxygen gas, hydrogen gas, etc.

Another important component used in such electrochemical conversion processes is a gas-tight membrane or a diaphragm, referred to as the gas separator diaphragm or simply as gas separator, that divides the electrochemical conversion devices into chambers or compartments and allows flow of ions from one such chamber to another, but does not allow flow of gases such as Oxygen or Hydrogen from one chamber to another and thereby keeping the products of the electrochemical conversions separate and thus recoverable. These electrochemical cell components i.e. the gas separator diaphragms and/or the gas diffusion electrodes are presently manufactured by using batch manufacturing.

Conventionally, electrochemical cell components such as gas separators are fabricated using different types of batch manufacturing processes. In a commonly used technique, a solution is made from an organic binding agent in a solvent. Furthermore, optionally an amount of metal oxide and/or metal hydroxide is added to the suspension in case of the gas diffusion electrodes, hereinafter also referred to as the GDE. The suspension is then set in form of a sheet and finally the solvent is removed by means of extraction through immersion in a non-solvent. Such gas separators have low mechanical strength and are prone to failures when subjected to pressurized chambers which are common in the electrolysers in which such gas separators are installed for usage. Furthermore, since such gas separators are fragile, installation of such gas separators into the electrolyser requires high skill and is often complicated and prone to tear or breakage of the gas separators.

To solve the problem of low mechanical strength and durability a mesh-structure or a fabric, for example a mesh of Ethylene-Tetrafluorethylene (ETFE) and Polyphenylene-sulfide (PPS), which forms the core or substrate of the gas separator may be used. The mesh-structure or the fabric is immersed in or is coated with the suspension and then the mesh-structure or the fabric along with the suspension coating is set to form the gas separator, generally by casting for example on an inert substrate such as in a glass tray or on a glass slab.

Subsequently, the solvent is removed by means of extraction through immersion of the gas separator in a non-solvent, generally by placing the gas separator along with the inert substrate into an open tank containing the non-solvent solution. Such gas separators with mesh-structure or fabric core or substrate are mechanically stronger but suffer from other disadvantages. One such disadvantage is that dimensions of such gas separator are limited by dimensions of the mesh-structure or fabric used. Furthermore, setting of the mess-structure or fabric in the suspension is complicated and needs to be carried out with utmost precession to obtain a uniformly formed gas separator.

Often the amount of coating of the solution on opposing sides of the mesh-structure or fabric is different and thus results in a non-uniform gas separator which is not optimally efficient for usage in the electrochemical conversion processes. Also, the mesh-structure or the fabric adds to the cost of such gas separators. Furthermore, the production process being batch manufacturing is labor intensive for example the conventionally known production methods required placing of the gas separator in the non-solvent bath and other subsequent baths, and most of these batch manufacturing steps require manual intervention or aid. Another disadvantage of using the batch manufacturing is that the size and shape of the gas separators is limited by the size and shape of the casting equipment used in the batch manufacturing.

SUMMARY

Thus, there exists a need for a manufacturing process for electrochemical cell components such as gas separators that is less labor intensive, not limited by the size and shape of the casting equipment used in the batch manufacturing, and which can be fully automated. The teachings of the present disclosure describe manufacturing techniques for making electrochemical cell components that are less labor intensive, not limited by the size and shape of the casting equipment used in the batch manufacturing, and which can be fully automated. In some embodiments, the electrochemical cell components produced by the manufacturing technique have requisite mechanical strength and do not suffer from limitations contributed by the mesh or the fabric.

For example, some embodiments include a continuous manufacturing method (100) for producing a non-reinforced electrochemical cell component (1) for use in an electrochemical conversion process, the method (100) comprising: forming (110) a web-form (5), from a web-material suspension (9), directly on a surface (23) of a conveyor belt (22) of a conveyor mechanism (20), wherein the web-material suspension (9) comprises interconnecting entities (3) suspended in a solution, the solution having an organic polymer binding material as a solute and a solvent for the solute, and a pore-forming material; advancing (120) the web-form (5)

through a first non-solvent bath (30), wherein the first non-solvent bath (30) comprises a first non-solvent (32) configured to introduce a phase inversion in the web-form (5) to form a web (8); detaching (130) the web (8) from the surface (23) of the conveyor belt (22); advancing (160) the web (8) through a pore-forming bath (60) to form the component (1); and collecting (190) the component (1).

In some embodiments, the method includes preparing (105) the web-material suspension (9), prior to forming (110) the web-form (5), wherein the web-material suspension (9) is prepared (105) by selecting a type of interconnecting entities (3) and a concentration of the interconnecting entities (3), and-continuously mixing the interconnecting entities (3) to the solution.

In some embodiments, forming (110) the web-form (5) comprises: curtain feeding (112) the web-material suspension (9) from a feed mechanism (10) onto the surface (23) of the conveyor belt (22), and defining (114) a thickness of the web-form (5) on the surface (23) of the conveyor belt (22).

In some embodiments, the method includes advancing (140) the web (8) through a second non-solvent bath (35), wherein the second non-solvent bath (35) comprises a second non-solvent (36), after detaching (130) the web (8) from the surface (23) of the conveyor belt (22).

In some embodiments, the method includes compressing (150) the web (8) for defining a thickness of the web (8).

In some embodiments, the method includes advancing (180) the web (8) through a washing bath (80) before collecting (190) the component (1).

In some embodiments, the non-reinforced electrochemical cell component (1) is a gas diffusion electrode.

In some embodiments, in selecting the type of interconnecting entities (3) and the concentration of the interconnecting entities (3), the type of interconnecting entities (3) selected comprises a material having catalytic property for the electrochemical conversion process, and the concentration of the interconnecting entities (3) is selected such that the interconnecting entities (3) physically contact each other to form a self-supporting electrically-conductive network (2) of the interconnecting entities (3) when the web-form (5) is formed (110) on the surface (23) of the conveyor belt (22).

In some embodiments, the method includes applying (170) a hydrophobic coating on a surface of the web (8) before collecting (190) the component (1).

In some embodiments, the non-reinforced electrochemical cell component (1) is a gas separator diaphragm.

In some embodiments, in selecting the type of interconnecting entities (3) and the concentration of the interconnecting entities (3), the type of interconnecting entities (3) selected comprises an inorganic material, and the concentration of the interconnecting entities (3) is selected such that the interconnecting entities (3) physically contact each other to form a self-supporting network (2) of the interconnecting entities (3) when the web-form (5) is formed (110) on the surface (23) of the conveyor belt (22).

In some embodiments, the organic polymer binding material is one of polysulphone, polyvinylidene fluoride, polyacrylonitrile, polyethyleneoxide, polymethylmethacrylate, or copolymers thereof.

In some embodiments, the solvent is one of N-methyl-2-pyrrolidone (NMP), N-ethyl-2-pyrrolidone (NEP), N,N-dimethylformamide (DMF), formamide, dimethylsulphoxide (DMSO), N,N-dimethylacetamide (DMAC), acetonitrile and mixtures thereof.

In some embodiments, the first non-solvent (32) is one of water, an alcohol, and a combination thereof.

In some embodiments, the interconnecting entities (3) are fibers.

BRIEF DESCRIPTION OF THE DRAWINGS

The present technique is further described hereinafter with reference to illustrated embodiments shown in the accompanying drawing, in which.

DETAILED DESCRIPTION

Figure 1:
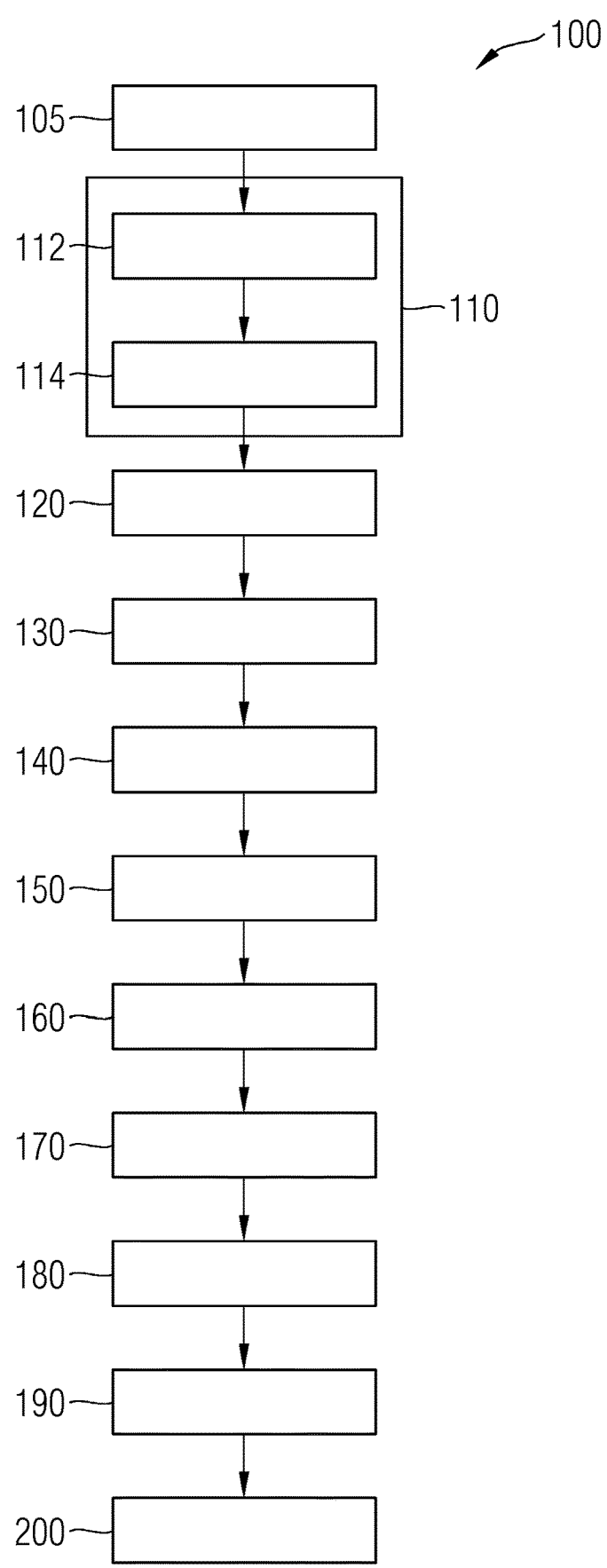
FIG. 1 presents a flow chart representing an exemplary embodiment of a continuous manufacturing method incorporating teachings of the present disclosure.

The present disclosure describes continuous manufacturing methods for producing a non-reinforced electrochemical cell component to be used in an electrochemical conversion process. The term 'non-reinforced' as used herein means not having a mesh or fabric layer as is conventionally used in gas separators, i.e. within the electrochemical cell component of the present technique any pre-formed mesh or fabric reinforcement is not embedded. Examples of the electrochemical conversion process are water electrolysis, electrochemical reduction of carbon dioxide, and other electrochemical processes carried out using electrochemical applications such as fuel cells and batteries. Examples of the non-reinforced electrochemical cell component, hereinafter also referred to as the electrochemical cell component or simply as the component, include gas separator diaphragms and gas diffusion electrodes. The present techniques allow continuous manufacturing as opposed to batch manufacturing. In some embodiments, the present technique comprises a continuous process or a continuous flow process because the materials used for manufacturing the component are processed, wherein different manufacturing steps are carried out, while being continuously in motion.

In some embodiments, a web-form is formed from a web-material suspension directly on a surface of a conveyor belt of a conveyor mechanism. The web-material suspension includes interconnecting entities suspended in a solution. The solution has an organic polymer binding material as a solute and a solvent for the solute, i.e. a polymer-solvent solution. The solution also has a pore-forming material. The interconnecting entities are entities, such as fibers, that have distinct and independent existence but that when put into a confined space or limited volume interconnect with each other, due to their configuration to form a network of such entities. The network resembles an interwoven or interlaced structure like a mesh formed from crisscrossing or interconnection of the entities. A web, as used in manufacturing applications such as the present technique, is a long, thin, and flexible material or body akin to a long sheet or a membrane that is processed in subsequently arranged processing stations or units or modules or sections of the continuous manufacturing system. The web-form is a precursor or a predecessor of the web, i.e. the web-form albeit not solid or firm enough to maintain its shape, form or configuration without support has a shape, form and structure substantially resembling the web to be formed.

In some embodiments, the web-form so formed on the conveyor belt is advanced through a first non-solvent bath. The first non-solvent bath includes a first non-solvent. The first non-solvent interacts with the web-form and introduces a phase inversion in the web-form i.e. selectively extracts at least a part of the solvent for the solute, i.e. removes the solvent from the aforementioned polymer-solvent solution, leaving a porous, solid membrane i.e. the web. The web is detached from the surface of the conveyor belt. The detached web is advanced through a pore-forming bath to form the component, which is finally collected. The phrase 'advanced through' a bath, as used in the present technique, means moving in one side and out of the other side of the material or solution or liquid forming the bath. The web remains submerged in the material or solution or liquid of the bath while moving from the one side to the other side.

In some embodiments, a component manufactured using the teachings of the present disclosure is efficiently produced. The efficiency stems from not having a mesh support or underlying reinforcement material, i.e. for example PPS or ETFE meshes, and the production is not limited by size of the casting equipment. The manufacturing is labor efficient and can be fully automated.

In some embodiments, prior to forming the web-form on the conveyor belt surface, the web-material suspension is prepared by selecting a type and a concentration of the interconnecting entities, and by continuously mixing the interconnecting entities to the polymer-solvent solution.

In some embodiments, in forming the web-form, curtain feeding of the web-material suspension is performed from a feed mechanism onto the surface of the conveyor belt, i.e. an uninterrupted curtain of fluid, i.e. the web-material suspension falls onto the surface of the conveyor belt to form the web-form. The thickness of the web-form on the surface of the conveyor belt is subsequently defined by using a thickness control mechanism such as a doctor blade disposed at a desired height above the surface of the conveyor belt.

In some embodiments, the web is advanced through a second non-solvent bath. The second non-solvent bath includes a second non-solvent and introduces phase inversion in the web i.e. continues selectively extraction of the solvent for the solute, i.e. removal of the solvent from the aforementioned polymer-solvent solution, leaving a more porous, further solidified web. The web is advanced through the second non-solvent bath after detaching the web from the surface of the conveyor belt.

In some embodiments, the web is compressed, for example by passing the web through a pair of compressing rollers or drums. The compressing defines the thickness of the web and also modifies the porous structure of the web.

In some embodiments, the web is advanced through a washing bath before collecting the component. This helps in removal of any residual non-solvents or the pore-forming solvent.

In some embodiments, the electrochemical cell component is a gas diffusion electrode. In a related embodiment of the method, when selecting the type and the concentration of the interconnecting entities, the type of interconnecting entities selected includes a material having catalytic property for the electrochemical conversion process, and the concentration of the interconnecting entities is selected such that the interconnecting entities physically contact each other to form a self-supporting electrically-conductive network of the interconnecting entities when the web-form is formed on the surface of the conveyor belt. Thus, continuous manufacturing of a gas diffusion electrode is achieved by the present technique. In some embodiments, a hydrophobic coating is applied, for example by spraying a hydrophobic material from a spray station, on a surface of the web before collecting the component or before washing the web.

In some embodiments, the electrochemical cell component is a gas separator diaphragm. In some embodiments, when selecting the type and the concentration of the interconnecting entities, the type of interconnecting entities selected includes an inorganic material, and the concentration of the interconnecting entities is selected such that the interconnecting entities physically contact each other to form a self-supporting network of the interconnecting entities when the web-form is formed on the surface of the conveyor belt. Thus, continuous manufacturing of a gas separator diaphragm is achievable.

In some embodiments, the organic polymer binding material is one of polysulphone, polyvinylidene fluoride, polyacrylonitrile, polyethyleneoxide, polymethylmethacrylate, or copolymers thereof. The polymers have high heat resistance, oxidation/reduction resistance, and durability and sheet forming properties.

In some embodiments, the solvent is one of N-methyl-2-pyrrolidone (NMP), N-ethyl-2-pyrrolidone (NEP), N,N-dimethylformamide (DMF), formamide, dimethylsulphoxide (DMSO), N,N-dimethylacetamide (DMAC), acetonitrile and mixtures thereof. These provide examples for realizing the method of the present technique by providing a solvent for the solute i.e. for the organic binding material.

In some embodiments, the first non-solvent is one of water, an alcohol, and a combination thereof. The second non-solvent may be same as the first non-solvent. The non-solvents are readily available and cheap and thus help the method to be further cost efficient.

In some embodiments, the interconnecting entities are fibers, i.e. electrically conducting fibers, inorganic fibers, fibers coated with catalytic material, etc. Fiber generally have branched structures and this aids in formation of the self-supporting networks in the component, and thus obviating requirement of having a supporting mesh.

Hereinafter, above-mentioned and other features of the present disclosure are described in detail. Various embodiments are described with reference to the drawings, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the scope of the teachings herein. It may be evident that such embodiments may be practiced without these specific details.

It may be noted that in the present disclosure, the terms "first", "second", etc. are used herein only to facilitate discussion, and carry no particular temporal or chronological significance unless otherwise indicated.

Figure 3:
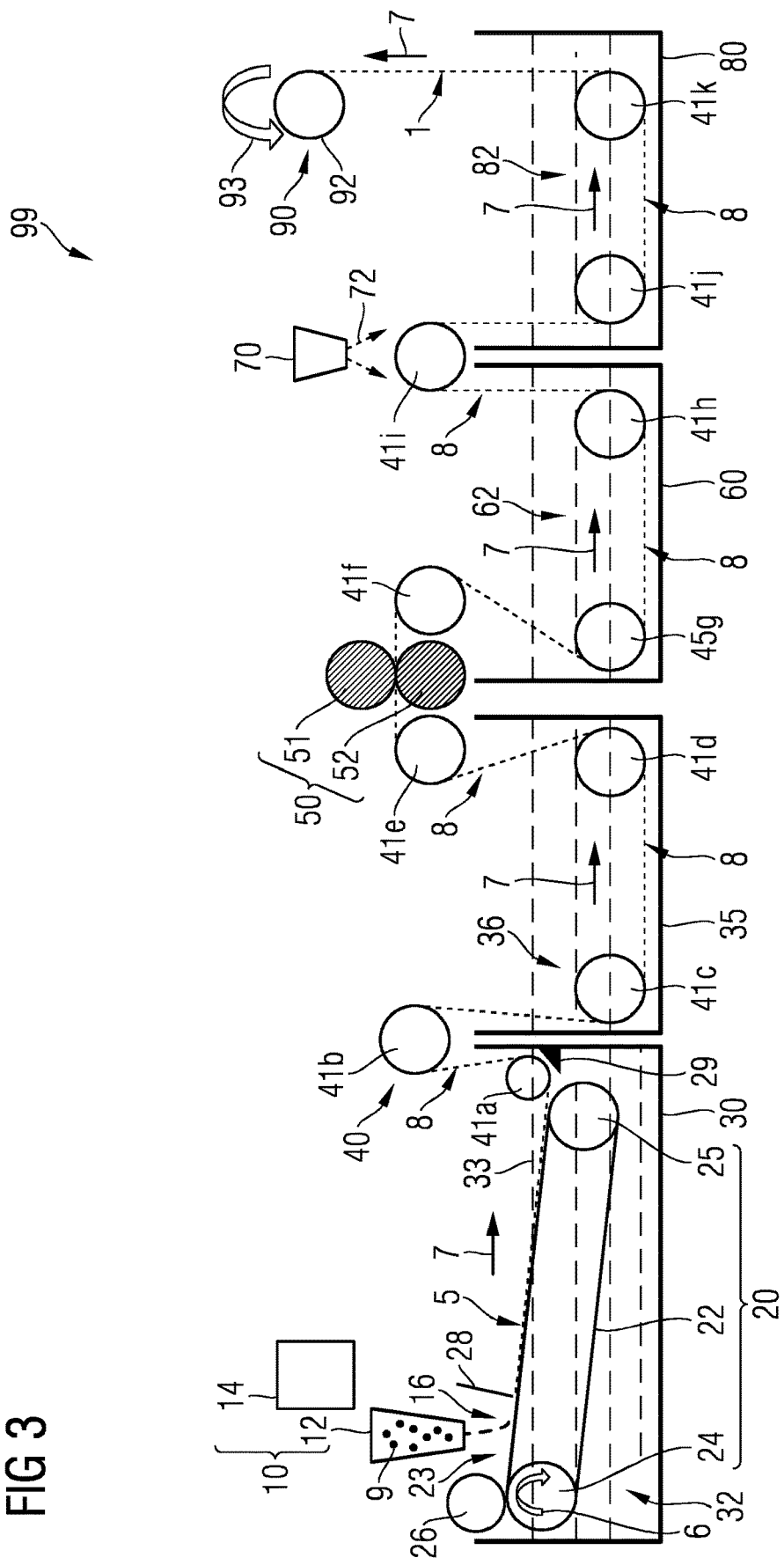
FIG. 3 schematically illustrates an exemplary embodiment of system for continuous manufacturing method incorporating teachings of the present disclosure.

FIG. 1 and FIG. 3 have been used in combination to explain an exemplary embodiment of a continuous manufacturing method 100, hereinafter also referred to the method 100, incorporating teachings of the present disclosure.

Figure 2:
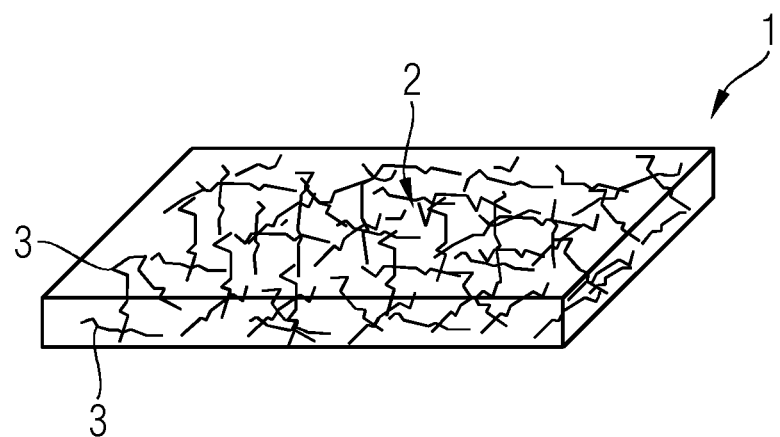
FIG. 2 schematically represents an exemplary embodiment of a part of a non-reinforced electrochemical cell component produced by continuous manufacturing method incorporating teachings of the present disclosure.

The method 100 is used to produce a non-reinforced electrochemical cell component 1, as shown in FIG. 2. The non-reinforced electrochemical cell component 1, herein after also referred to as the component 1 or as the electrochemical cell component 1, is for use in an electrochemical conversion process. The component 1 may be a gas diffusion electrode (GDE) or a gas separator diaphragm. The component 1 may be well suited for fuel cells, batteries, and other suitable electrolysers that require a gas-gas or a gas-liquid interaction.

FIG. 3 shows an exemplary embodiment of a system 99 that is used for the method 100. To start the method 100, a web-material suspension 9 is required. The web-material suspension 9, hereinafter also referred to as the suspension 9, includes interconnecting entities 3, as shown in FIG. 2, suspended in a solution. The solution has an organic polymer binding material as a solute and a solvent for the solute, i.e. polymer-solvent solution. The solution also includes a pore-forming material.

To make the suspension 9, the solution of the organic polymer binding material, such as a polymer binding agent for example polysulphone is first prepared in a solvent such as N-methyl-2-pyrrolidone (NMP), for example in a proportion of 10 to 30 percent by weight binding agent in relation to the amount of solvent. Other examples of suitable materials to be used as the organic polymer binding material are, but not limited to, polyvinylidene fluoride (PVDF), polyacrylonitrile (PAN), polyethyleneoxide (PEO), polymethylmethacrylate (PMMA), or copolymers thereof. Other examples of the solvent include, but not limited to, N-ethyl-2-pyrrolidone (NEP), N,N-dimethylformamide (DMF), formamide, dimethylsulphoxide (DMSO), N,N-dimethylacetamide (DMAC), acetonitrile and mixtures thereof. Examples of the pore-forming material added to the solution either along with or subsequent to the addition of the organic polymer binding material may be, but not limited to, Zinc oxide, a polymer such as polyvinylpyrrolidone (PVP), cross-linked polyvinylpyrrolidone (PVPP), poly(vinyl alcohol), poly(vinyl acetate), methyl cellulose and polyethylene oxide. The amount of the pore-forming material that is added to the solution 9 depends on a desired porosity of the component 1. For example, when using PVP as the pore-forming material a suitable amount lies between 0.5 percent by weight and 2 percent by weight, for example 0.7 percent by weight (% wt) of the entire composition of the suspension 9. However, if porosity of the component 1 is desired to be high, a suitable amount of the pore-forming material may be between 0.5% wt and 50% wt.

In some embodiments, the pore-forming material is added to the suspension 9 after the organic polymer binding material has been dissolved. In some embodiments, first the pore-forming material is dissolved in the solvent, after which the organic polymer binding material is added to the formed solution, in some cases at an increased temperature, for example at 70 to 75 degrees Celsius.

The interconnecting entities 3, hereinafter also referred to as the IEs 3, that are added to the suspension 9 are entities that have a generally elongated, and preferable branched structure, for e.g. fibers, flakes, etc. The material with which the IEs 3 are formed of may be of different types depending upon a desired use of the component 1. The IEs 3 have a physical structure that promotes interlinking when adequate amount of the IEs 3 are confined in a suitable volume, for example the IEs 3 may be elongated rod shaped or branched or un-branched fibers, or may be flakes, as opposed to small particles. The fibers or the flakes when concentrated or limited in given volume physically touch each other forming more interconnections as compared to rounded or compact particles concentrated or limited in the given volume.

A net length of the IEs 3, the length of the un-branched fiber or total length of all the branches added with length of the part of the branched fiber from which the branches arise, may be between 0.1 micrometer and 1000 micrometer. The average diameter of the fibers may be between 0.05 micrometer and 50 micrometers. A thickness of the flakes may be between 0.05 micrometer and 10 micrometer and a surface area of one side of the flake may be between 0.2 square micrometers and 0.2 square millimeters.

For example, when the component 1 is desired to be used as a GDE, the material, or at least an outer coating material, of which the IEs 3 are made from is a material having catalytic property for the electrochemical conversion process. In some embodiments, the material is electrically conducting. For example, if the GDE being made by the present technique is intended to be used for electrochemical conversion of carbon dioxide to carbon monoxide, then the interconnecting entities 3 selected includes or is formed of silver, silver alloy, copper, copper alloy, and so on and so forth. The silver, silver alloy, etc. act as catalysts for one or more of the electrochemical reactions that result in conversion of carbon dioxide to carbon monoxide. Furthermore, silver, silver alloy, copper, copper alloy, etc. are electrically conducting. The amount of the IEs 3 is selected such that the finally formed GDE has a dry ratio of 90/10 wt % IEs 3/organic binding polymer content, for example, the amount of the IEs 3 in the manufactured GDE could be between 5 to 95 wt % of the dry weight of the GDE. The preferred range would be between 80 wt % and 95 wt %.

In some embodiments, when the component 1 is desired to be used as a gas separator diaphragm or membrane, the IEs 3 may be inorganic material e.g. inorganic fibers such as, but not limited to, Potassium titanate, zirconia fibers, Barium sulphate fibers, Wollastonite fibers, and a combination thereof. Potassium titanate has been observed to be particularly stable in use of alkaline water electrolysis. The inorganic fibers used in the present technique are hydrophilic. The amount of the inorganic fibers added to the solution may be selected based on the requirement for which the gas separator diaphragm is being made. In general, a suitable amount of the inorganic fibers, for example Potassium titanate, is between 5 percent by weight and 85 percent by weight.

Furthermore, in the method 100 such an amount of the IEs 3 is used and owing to generally extended structure of the interconnecting entities, the IEs 3 when forming the part of the manufactured component 1 form a self-supporting network 2, as shown in FIG. 3. In case the component 1, is a GDE, the self-supporting network 2 is also electrically conducting. The network 2 provides mechanical strength and physical integrity to other constituents of the component 1, in short the network 2 of the IEs 3 holds the component 1 together. The network 2 is formed by physical linking or touching or interconnections between the IEs 3. The network 2 runs through the volume of the component 1. Thus, the network 2 provides mechanical reinforcement and structural integrity to the component 1, and optionally when the component 1 is a GDE, the network 2 provides one or more catalytic properties and electrical conductivity to the component 1, i.e. the gas diffusion electrode.

In some embodiments, the system 99 has a conveyor mechanism 20. The conveyor mechanism 20 includes a conveyor belt 22 and a surface 23 of the conveyor belt 22. The conveyor belt 22 is driven by wheels or pulleys for example a drive pulley 24, an exterior pulley 26, and an interior pulley 25. An arrow 6 depicts a direction of rotation of the drive pulley 24 and thus the direction of rotation of the conveyor belt 22 and also a forward direction for the method 100 of the present technique. The surface 23 is formed of, or may optionally be coated with, a material to which the suspension 9 does not bond to, for example by coating with a release agent. The conveyor belt 22 is made from strong, flexible and planar materials which do not react with the solvent in the suspension 9, for example a stainless steel belt 22 or a stainless steel belt coated with PTFE.

In a step 110, a web-form 5 is formed on the surface 23. The web-form 5 is formed of the suspension 9. Above the conveyor belt 22, is disposed a feeding mechanism 10. The feeding mechanism 10 may include a feeder 12 and a feed control 14. The feeder 12 discharges the suspension 9 onto the surface 23 of the conveyor belt 22. The feed control 14 controls the rate of discharge. The feeder 12 preferable discharges the suspension 9 in form of a curtain 16 of material of suspension 9, i.e. through a step 112 of curtain feeding. The suspension 9 deposited onto the surface 23 is formed in a form of a spread or a layer on the surface 23, referred to as the web-form 5. The thickness, i.e. height from the surface 23, of the web-form 5 and breadth or width of the web-form 5 depend on the size of the curtain feed and the rate of discharge from the feeder 12. The web-form 5 moves forward due to rotation of the conveyor belt 22. It may be noted that since the method 100 is a continuous manufacturing process, length of the web-form 5 is continuous i.e. the layer keeps on forming until the feeder 12 keeps on discharging the suspension 9. So when a part of the web-form 5 proceeds further, along with the surface 23 of the conveyor belt 22, a subsequent continuous part is seamlessly formed behind the part that proceeded.

Above the conveyor belt 22 is also disposed a thickness control mechanism 28. The web-form 5 is passed through the thickness control mechanism 28 to define a thickness of the web-form 5, in a step 114. The thickness control mechanism 28 may for example be a doctor blade, also referred to as a doctor knife, that is disposed at a desired height from the surface 23 such that when the layer passes through the space between the thickness control mechanism 28 and the surface 23, the layer acquires or is limited to a desired thickness. It may be noted that the step 110 may also be performed in a different way than the steps 112 and the step 114, for example the suspension 9 may be discharged on the surface 23 and then spread to become the web-form 5 by the doctor blade 28.

Thereafter, the web-form 5 is advanced, in a step 120, through a first non-solvent bath 30. The first non-solvent bath 30 has a first non-solvent 32. The web-form 5 sitting on the surface 23 enters the first non-solvent bath 30 i.e. moves through the first non-solvent submerged therein. The first non-solvent introduces or induces and carries out, at least partially, a phase inversion in the web-form 5 leading to formation of the web 8. The phase inversion is introduced by extracting the solvent from the web-form 5, i.e. by extracting the solvent from the polymer-solvent solution of the suspension 9. The first non-solvent 32 may be water, alcohol or a mix of water and alcohol. Suitable types of alcohol are ethanol, but especially isopropyl alcohol.

One way of performing the step 120 is by positioning the conveyor belt 22 such that a downstream part of the conveyor belt 22 is submerged in the first non-solvent 32, i.e. is below a surface 33 of the first non-solvent 32 in the first non-solvent bath 30. An upstream part of the conveyor belt 22, where the suspension 9 lands after being discharged from the feeder 12 is above the surface 33 of the first non-solvent 32, as shown in FIG. 3. Therefore, any point on the surface 23 of the conveyor belt 22 while rotating gets submerged and then re-emerges and is subsequently submerged and so on and so forth in a looped manner. The system 99 may include a wiping mechanism present towards the upstream side of the conveyor belt 22 such that when the surface 23 of the conveyor belt 22 re-emerges from the first-non solvent 32, the surface 23 is wiped for removing retained drops or patches of the first non-solvent 23. The wiping mechanism may be formed as a roller drum with external surface of the roller drum covered with absorbent material such as cotton fabric or a superabsorbent material layer.

At the downstream side of the system 99 is present a detaching knife 29 that detaches the web-form 5, in a step 130 from the surface 23 for example by an action akin to scrapping or scooping. The system 99 also includes a guide mechanism 40, also referred in manufacturing industry as web-guiding system 40. The guide mechanism 40 includes a number of guide rollers or guide pulleys 41a-41k using which a motion of the web 8 is guided or directed, and sometimes also propelled, in a general direction 7. One such guide roller 41a guides the web 8 from the detaching knife 29 to outside of the first non-solvent bath 30.

Optionally, in a step 140, the web 8 is advanced through a second non-solvent bath 35, after detaching 130 the web 8 from the surface 23 of the conveyor belt 22. The second non-solvent bath 35 comprises a second non-solvent 36. The second non-solvent 36 may also be water, alcohol or a mix of water and alcohol, same as the first non-solvent 32 or different in alcohol and water ration as compared to the first non-solvent 32. The web 8 when passed through the second non-solvent 36 is subjected to continuation of the phase inversion similar to the phase inversion experienced by the web-form 5 in the step 120. The advancing of the web 8 through the second non-solvent bath 35 in the direction 7 is aided by the guide rollers 41b, 41c and 41d as shown in FIG. 3.

Thereafter, optionally in a step 150, the web 8 is compressed, for example by using compression rollers 51,52 that together form a web compression mechanism 50, also referred sometimes as calendar rollers. The advancing of the web 8 through the web compression mechanism 50 in the direction 7 is aided by the guide rollers 41e and 41f as shown in FIG. 3.

In the method 100, thereafter the web 8 is advanced through a pore-forming bath 60. The pore-forming bath 60 includes a solvent 62 for the pore-forming material. For example, when the pore-forming material is Zinc oxide in the step 150, the solvent 62 is acidic or alkaline bath, whereas when the pore-forming material is PVP the solvent 62 is boiling water. The removal of the pore-forming material provides pores on a surface and internally in the web 8 thereby forming the component 1. The advancing of the web 8 through the pore-forming bath 60 in the direction 7 is aided by the guide rollers 41f, 45g, and 41h as shown in FIG. 3. In a step 190, the component 1 is collected by a collection mechanism 90, for example by a technique of reeling carried out by a rotation of a reel 92 in a direction 93.

Optionally, before the component 1 is collected in the step 190, the web 8 is advanced through a washing bath 80 in a step 180. The washing bath 80 includes a washing solution 82, for example water. Any residual non-solvents and/or other undesired material on the web 8 are washed away in the step 180. The washing solution 82 is renewed, continuously or intermittently.

The component 1 so collected in the step 190 may be subjected to further processing in a step 200 for example roll slitting may be performed. In some embodiments, the system 99 may include a coating station 70, for example a spray station 70. In an optional step 170 and only when the component 1 is a GDE, the web 8 before being washed in the step 180 or before being collected in the step 190, if the step 180 is absent, is advanced to the spray station 70 under which a spray 72 of hydrophobic material is deposited on a surface of the web 8.

In some embodiments, prior to forming the web-form 5 on the conveyor belt surface 23, in a step 105 the web-material suspension 9 is prepared by selecting a type and a concentration of the interconnecting entities 3, and by continuously mixing the interconnecting entities 3 to the polymer-solvent solution. The selection of type and concentration of the IEs 3 are done as explained earlier.

Hereinafter some examples are provided for continuous manufacturing method 100 for purposes of illustration and explanation, and not for limitation.

Example 1: Continuous Manufacturing 100 of a Gas Separator Diaphragm 1

The suspension 9 includes PPSU (Polyphenylsulfone) as organic polymer binding material dissolved in NMP as solvent for PPSU to form between 5 wt % and 30 wt % solution, i.e. polymer-solvent solution. To the solution is then mixed a suitable amount of fibers e.g. between 2 wt % and 30 wt % potassium titanate, and between 20 wt % (weight percent) and 60 wt % $ZrO_2$ (Zirconium dioxide) as hydrophilic material, and between 10 wt % and 30 wt % Zinc Oxide as pore-forming material.

The suspension 9 is curtain fed 112 on the surface 23 of the conveyor belt 22 at a rate between 1 ml/min (milliliter per minute) and 20 ml/min, and in the step 114 a thickness of the web-form 5 is defined by a height of the doctor blade positioned between 100 µm and 1000 µm, and precisely 400 µm (micrometer).

The first non-solvent 32 in the step 120 is Isopropanol/$H_2O$ in 50/50 vol % (volume percent). The second non-solvent in the step 140 is $H_2O$. The pore-forming material solvent 62 in the step 160 is diluted Hydrochloric acid, for example 15 wt % concentration in water.

The gas separator diaphragm 1 produced by the continuous manufacturing method 100 is suitable for being used in Water electrolysis, $CO_2$ electrolysis other electrochemical applications, e.g. fuel cells and batteries.

Example 2: Continuous Manufacturing 100 of a Gas Diffusion Electrode 1

The suspension 9 includes PVDF as organic polymer binding material dissolved in NMP as solvent for PVDF to form between 5 wt % and 30 wt % solution, i.e. polymer-solvent solution. To the solution is then mixed a suitable amount of fibers e.g. between 30 wt % and 90 wt % silver (Ag). Furthermore, to the suspension 9 between 1 wt % and 10 wt % Zinc Oxide as pore-forming material is added along with between 1 wt % and 20 wt % PTFE (Polytetrafluoroethylene) having particle size between 100 nm (nanometer) and 20 µm. The aforementioned composition of the suspension 9 is for obtaining an end product composition of the GDE 1 having 75 Wt % Ag, 15 wt % PVDF, and 10 wt % PTFE. In some embodiments, PTFE instead of being added, or in addition to being added, may be sprayed onto one side of the web 8 in the step 170 of the method 100.

The suspension 9 is curtain fed 112 on the surface 23 of the conveyor belt 22 at a rate between 1 ml/min and 20 ml/min, and in the step 114 a thickness of the web-form 5 is defined by a height of the doctor blade positioned between 100 µm and 1000 µm, and precisely 400 µm.

The first non-solvent 32 in the step 120 is Isopropanol/$H_2O$ in 50/50 vol % (volume percent). The second non-solvent in the step 140 is $H_2O$. The pore-forming material solvent 62 in the step 160 is diluted Hydrochloric acid, for example 15 wt % concentration in water.

The gas diffusion electrode 1 produced by the continuous manufacturing method 100 is suitable for being used in Water electrolysis, $CO_2$ electrolysis other electrochemical applications, e.g. fuel cells and batteries.

While the present technique has been described in detail with reference to certain embodiments, it should be appreciated that the present technique is not limited to those precise embodiments. Rather, in view of the present disclosure which describes exemplary modes for practicing the teachings, many modifications and variations would present themselves, to those skilled in the art without departing from the scope and spirit of this disclosure.

What is claimed is:

1. A continuous manufacturing method for producing a non-reinforced electrochemical cell component for an electrochemical conversion process, the method comprising:
   forming a web-form from a web-material suspension directly on a surface of a conveyor belt of a conveyor mechanism,
   wherein the web-material suspension comprises interconnecting entities suspended in a solution,
   the solution including an organic polymer binding material as a solute and a solvent for the solute, and a pore-forming material;
   advancing the web-form through a first bath,
   wherein the first bath comprises a first liquid configured to introduce a phase inversion in the web-form to form a web;
   detaching the web from the surface of the conveyor belt;
   advancing the web through a pore-forming bath containing a solvent to remove the pore-forming material from the web and forming the component; and
   collecting the component.

2. The method according to claim 1, further comprising compressing the web to define a thickness of the web.

3. The method according to claim 1, further comprising advancing the web through a washing bath before collecting the component.

4. The method according to claim 1, wherein the non-reinforced electrochemical cell component comprises a gas separator diaphragm.

5. The method according to claim 1,
   wherein the first liquid comprises at least one material selected from the group consisting of: water and alcohol.

6. The method according to claim 1, wherein the interconnecting entities comprise fibers.

7. The method according to claim 1, further comprising advancing the web through a second bath after detaching the web from the surface of the conveyor belt and before advancing the web into the pore-forming bath.

8. The method according to claim 1, wherein the organic polymer binding material comprises at least one material selected from the group consisting of: polysulphone, polyvinylidene fluoride, polyacrylonitrile, polyethyleneoxide, polymethylmethacrylate, and copolymers thereof.

9. The method according to claim 1, wherein the solvent comprises at least one material selected from the group consisting of: N-methyl-2-pyrrolidone (NMP), N-ethyl-2-pyrrolidone (NEP), N,N-dimethylformamide (DMF), formamide, dimethyl sulphoxide (DMSO), N,N-dimethylacetamide (DMAC), and acetonitrile.

10. The method according to claim 1, wherein forming the web-form comprises:
  curtain feeding the web-material suspension from a feed mechanism onto the surface of the conveyor belt; and
  defining a thickness of the web-form on the surface of the conveyor belt.

11. The method according to claim 1, wherein the non-reinforced electrochemical cell component comprises a gas diffusion electrode.

12. The method according to claim 11, further comprising applying a hydrophobic coating on a surface of the web before collecting the component.

13. The method according to claim 1, further comprising preparing the web-material suspension, prior to forming the web-form;
  wherein the web-material suspension is prepared by selecting a type of interconnecting entities and a concentration of the interconnecting entities and continuously mixing the interconnecting entities to the solution.

14. The method according to claim 13, wherein:
  the non-reinforced electrochemical cell component comprises a gas diffusion electrode; and
  the interconnecting entities comprise a material with a catalytic property for an intended electrochemical conversion process; and
  the concentration of the interconnecting entities provides that the interconnecting entities physically contact each other to form a self-supporting electrically-conductive network of the interconnecting entities when the web-form is formed on the surface of the conveyor belt.

15. The method according to claim 13, wherein:
  the non-reinforced electrochemical cell component comprises a gas separator diaphragm; and
  the interconnecting entities comprise an inorganic material; and
  the concentration of the interconnecting entities provides that the interconnecting entities physically contact each other to form a self-supporting network of the interconnecting entities when the web-form is formed on the surface of the conveyor belt.

\* \* \* \* \*